US012755978B2

(12) United States Patent
Lee et al.

(10) Patent No.: US 12,755,978 B2
(45) Date of Patent: *Oct. 6, 2026

(54) ELECTRODE, SECONDARY BATTERY COMPRISING THE SAME, AND METHOD FOR MANUFACTURING THE SAME

(71) Applicant: LG Energy Solution, Ltd., Seoul (KR)

(72) Inventors: Nam-Jeong Lee, Daejeon (KR); Koo-Seung Chung, Daejeon (KR); Sang-Min Kwak, Daejeon (KR); Ji-Hyun Kim, Daejeon (KR); Dong-Oh Shin, Daejeon (KR); Ki-Seok Lee, Daejeon (KR); Kwang-Ho Yoo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/062,583

(22) Filed: Feb. 25, 2025

(65) Prior Publication Data

US 2025/0239614 A1 Jul. 24, 2025

Related U.S. Application Data

(63) Continuation of application No. 19/052,842, filed on Feb. 13, 2025, which is a continuation of application
(Continued)

(30) Foreign Application Priority Data

Oct. 5, 2021 (KR) ........................ 10-2021-0131944
Apr. 20, 2022 (KR) ........................ 10-2022-0049210

(51) Int. Cl.
*H01M 4/62* (2006.01)
*H01M 4/02* (2006.01)
(Continued)

(52) U.S. Cl.
CPC ......... *H01M 4/623* (2013.01); *H01M 4/0435* (2013.01); *H01M 4/13* (2013.01);
(Continued)

(58) Field of Classification Search
CPC ............................................ H01M 4/621–623
See application file for complete search history.

(56) References Cited

U.S. PATENT DOCUMENTS

2003/0175588 A1 9/2003 Zhang
2006/0166094 A1 7/2006 Suzuki
(Continued)

FOREIGN PATENT DOCUMENTS

CN 104025340 A 9/2014
JP 2006203126 A 8/2006
(Continued)

OTHER PUBLICATIONS

Machine translation of WO 2019/244282 A1 (Year: 2019).*
(Continued)

*Primary Examiner* — Robert S Carrico
(74) *Attorney, Agent, or Firm* — Lerner David LLP

(57) ABSTRACT

Disclosed are an electrode, a secondary battery comprising the same and an energy storage system, the electrode comprising: an electrode current collector; and an electrode layer on the electrode current collector, the electrode layer comprising an active material, a conductive material and a fluorine-containing binder, wherein the electrode layer has a quantified binder ratio (QBR) of 1.1 or less, and the QBR is defined as the following equation:

$$QBR=Bs/Bf.$$

Bs denotes an average fluorine content in an electrode layer surface region within 15% of a total thickness of the electrode layer from an outermost surface of the electrode layer, and Bf denotes an average fluorine content in an
(Continued)

electrode layer bottom region within 15% of the total thickness of the electrode layer from an interface between the electrode layer and the current collector.

19 Claims, 3 Drawing Sheets

Related U.S. Application Data

No. 18/691,768, filed as application No. PCT/KR2022/014927 on Oct. 4, 2022.

(51) Int. Cl.
*H01M 4/04* (2006.01)
*H01M 4/13* (2010.01)
*H01M 4/139* (2010.01)
*H01M 10/052* (2010.01)

(52) U.S. Cl.
CPC ........... *H01M 4/139* (2013.01); *H01M 4/625* (2013.01); *H01M 10/052* (2013.01); *H01M 2004/021* (2013.01)

(56) References Cited

U.S. PATENT DOCUMENTS

| | | | |
|---|---|---|---|
| 2007/0020514 | A1 | 1/2007 | Ozaki et al. |
| 2011/0262811 | A1 | 10/2011 | Kinoshita et al. |
| 2013/0224587 | A1 | 8/2013 | Uemura |
| 2014/0272540 | A1 | 9/2014 | Takahata et al. |
| 2015/0303481 | A1 | 10/2015 | Duong et al. |
| 2016/0190565 | A1 | 6/2016 | Woo et al. |
| 2018/0076451 | A1 | 3/2018 | Kim et al. |
| 2020/0274164 | A1 | 8/2020 | Nakano et al. |
| 2020/0321599 | A1 | 10/2020 | Kim et al. |
| 2021/0344014 | A1 | 11/2021 | Park et al. |
| 2023/0042207 | A1* | 2/2023 | Kang .................... H01M 4/622 |
| 2023/0108728 | A1 | 4/2023 | Jin et al. |
| 2023/0378468 | A1 | 11/2023 | Katou et al. |
| 2024/0372069 | A1 | 11/2024 | Yamashita et al. |
| 2025/0125367 | A1 | 4/2025 | Kim et al. |
| 2025/0132343 | A1 | 4/2025 | Lee et al. |
| 2025/0183312 | A1 | 6/2025 | Kim et al. |

FOREIGN PATENT DOCUMENTS

| | | | |
|---|---|---|---|
| JP | 2007026984 | A | 2/2007 |
| JP | 2008084742 | A | 4/2008 |
| JP | 2013062131 | A | 4/2013 |
| JP | 201572793 | A | 4/2015 |
| JP | 2016122646 | A | 7/2016 |
| JP | 2016186921 | A | 10/2016 |
| KR | 20060025230 | A | 3/2006 |
| KR | 20160040830 | A | 4/2016 |
| KR | 101673724 | B1 | 11/2016 |
| KR | 20160145043 | A | 12/2016 |
| KR | 20170020032 | A | 2/2017 |
| KR | 20180028814 | A | 3/2018 |
| KR | 101875254 | B1 | 7/2018 |
| KR | 20190097765 | A | 8/2019 |
| KR | 20190124038 | A | 11/2019 |
| KR | 20200017218 | A | 2/2020 |
| WO | 2005008807 | A2 | 1/2005 |
| WO | 2011033707 | A1 | 3/2011 |
| WO | 2019244282 | A1 | 12/2019 |
| WO | 2021028619 | A1 | 2/2021 |
| WO | 2021192541 | A1 | 9/2021 |
| WO | 2022163186 | A1 | 8/2022 |

OTHER PUBLICATIONS

Brown EN et al. The effect of crystallinity on the fracture of polytetrafluoroethylene (PTFE). Materials Science and Engineering: C, vol. 26, Issue 8, Oct. 6, 2005, pp. 1338-1343. <DOI: 10.1016/j.msec.2005.08.009> (Year: 2005).*

Extended European Search Report including Written Opinion for Application No. 22878860.0 dated Jun. 3, 2025. 10 pages.

International Search Report for PCT/KR2022/014927 mailed Jan. 25, 2023. 3 pages.

Request for the Submission of an Opinion for a Korean Office Action Application No. 10-2022-0126649, dated Jul. 10, 2023, 8 pages.

Written Decision on Registration for a Korean Office Action Application No. 10-2022-0126649, dated Nov. 8, 2023, 3 pages.

* cited by examiner

ELECTRODE, SECONDARY BATTERY COMPRISING THE SAME, AND METHOD FOR MANUFACTURING THE SAME

CROSS-REFERENCE TO RELATED APPLICATIONS

The present application is a continuation of U.S. patent application Ser. No. 19/052,842, filed on Feb. 13, 2025, which is a continuation of U.S. patent application Ser. No. 18/691,768, filed on Mar. 13, 2024, which is a national phase entry under 35 U.S.C. § 371 of International Application No. PCT/KR2022/014927, filed Oct. 4, 2022, which claims priority from Korean Patent Application No. 10-2021-0131944, filed on Oct. 5, 2021, and Korean Patent Application No. 10-2022-0049210, filed on Apr. 20, 2022, the disclosures of which are incorporated herein by reference.

TECHNICAL FIELD

The present disclosure relates to an electrode, a secondary battery comprising the same, and a method for manufacturing the same. More particularly, the present disclosure relates to an electrode having a uniform binder distribution in the thickness-wise direction of the electrode layer, a secondary battery comprising the same, and a method for manufacturing the same.

BACKGROUND ART

Due to a rapid increase in use of fossil fuel, there has been a growing need for use of alternative energy and clean energy. In keeping pace with the increasing demand, many studies are being made in the field of power generation and power storage using electrochemistry. Currently, secondary batteries are the most common electrochemical devices using electrical and chemical energy, and their range of applications is gradually expanding. Lithium secondary batteries are one of the major types of secondary batteries, and have been used in recent years an energy source of not only mobile devices but also electric vehicles and hybrid electric vehicles as an alternative to conventional vehicles such as gasoline vehicles and diesel vehicles using fossil fuel that is one of the main causes of air pollution, and their range of applications is expanding to auxiliary power supplies through electrical grid.

A process of manufacturing a lithium secondary battery largely includes an electrode forming process, an electrode assembly forming process and an aging process. The electrode forming process includes an electrode material mixing process, an electrode coating process, a drying process, a rolling process, a slitting process and a winding process.

Among them, the electrode material mixing process is a process of mixing the materials for forming an electrode active layer in which electrochemical reactions actually occur in the electrode, and specifically, an electrode active material as an essential element of the electrode is mixed with additive(s), for example, a conductive material, a filler, a binder used for the binding of powder particles and the adhesion to a current collector and a solvent for imparting viscosity and dispersing powder to prepare a slurry which is flowable.

The electrode coating process of applying the slurry to the current collector having electrically conductive properties and the drying process for removing the solvent in the electrode mixture slurry are performed, and a rolling process of the electrode is further performed to manufacture the electrode to a predetermined thickness.

In the electrode manufacturing process, the slurry liquid is dried in a drying oven in a short time after it is coated, and during drying, the binder migration to the electrode surface causes a non-uniform binder distribution in the thickness-wise direction of the electrode layer, resulting in low adhesion strength with the current collector.

DISCLOSURE

Technical Problem

The present disclosure is designed to solve the above-described problem, and therefore the present disclosure is directed to providing an electrode having a uniform binder distribution in the thickness-wise direction of the electrode layer, a secondary battery comprising the same, and a method for manufacturing the same.

Technical Solution

To solve the problem of the present disclosure, according to an aspect of the present disclosure, there is provided an electrode of the following embodiments.

According to a first embodiment, there is provided the electrode comprising an electrode current collector; and an electrode layer on the electrode current collector, the electrode layer comprising an active material, a conductive material and a fluorine-containing binder, wherein the electrode layer has a quantified binder ratio (QBR) of 1.1 or less, and the QBR is defined as the following equation:

$$QBR=Bs/Bf,$$

wherein Bs denotes an average fluorine content in an electrode layer surface region within 15% of a total thickness of the electrode layer from an outermost surface of the electrode layer, and Bf denotes an average fluorine content in an electrode layer bottom region within 15% of the total thickness of the electrode layer from an interface between the electrode layer and the current collector.

According to a second embodiment, in the first embodiment, the conductive material may comprise at least one of a carbon-based material, a metal material, a conductive whisker, a conductive metal oxide or a conductive polymer.

According to a third embodiment, in the first or second embodiment, the fluorine-containing binder may comprise polytetrafluoroethylene (PTFE).

According to a fourth embodiment, in any one of the first to third embodiments, the active material may be a positive electrode active material or a negative electrode active material.

According to a fifth embodiment, in any one of the first to fourth embodiments, the active material may be present in an amount of 85 to 98 parts by weight, the conductive material may be present in an amount of 0.5 to 5 parts by weight, and the fluorine-containing binder may be present in an amount of 0.5 to 10 parts by weight.

According to a sixth embodiment, in any one of the first to fifth embodiments, the electrode current collector may further comprise a conductive primer layer on at least one surface thereof.

According to a seventh embodiment, in any one of the first to sixth embodiments, the electrode layer may have the QBR of 0.95 to 1.05.

According to an eighth embodiment, in any one of the first to seventh embodiments, the electrode may have a bending resistance of 10 mm @ or less.

According to a ninth embodiment, in the eighth embodiment, the bending resistance of the electrode may be evaluated in accordance with a measurement standard JIS K5600-5-1 method.

According to a tenth embodiment, in the eighth or ninth embodiment, the bending resistance of the electrode may be evaluated by preparing a rectangular electrode sample of 100 mm×50 mm; preparing measurement rods of 2, 3, 4, 5, 6, 8, 10, 12, 16, 20, 25 and 32 mm in diameter, bringing the electrode sample into contact with the measurement rod using the measurement rod having the largest diameter and determining whether cracking occurs in a mixture film of the electrode sample when pulling up two ends of the electrode sample; and when cracking does not occur in the previous step, determining whether cracking occurs in the mixture film of the electrode sample in a same way as the previous step using the measurement rod having the next largest diameter, and repeatedly performing this process to determine, as the bending resistance, a minimum diameter value of the measurement rod at which cracking does not occur in the mixture film of the electrode sample.

According to an eleventh embodiment, in any one of the first to tenth embodiments, a degree of crystallinity of the fluorine-containing binder may be 10% or less.

According to a twelfth embodiment, in any one of the first to eleventh embodiments, the electrode layer may be formed by a dry process.

According to a thirteenth embodiment, there is provided a method for manufacturing the electrode of any one of the first to twelfth embodiments, the method comprising preparing a mixture comprising the active material, the conductive material and the fluorine-containing binder; kneading the mixture in a range between 70° C. and 200° C. under a pressure that is equal to or higher than an atmospheric pressure to prepare a mixture agglomerate; pulverizing the mixture agglomerate to obtain a mixed powder for electrodes; feeding the mixed powder for electrodes in between a plurality of rolls, followed by calendering to form a film for electrodes; and laminating the film for electrodes onto a metal current collector.

According to a fourteenth embodiment, in the thirteenth embodiment, the kneading to prepare the mixture agglomerate may be performed in a kneader under the pressure that is equal to or higher than the atmospheric pressure.

According to a fifteenth embodiment, in the thirteenth or fourteenth embodiment, a compression ratio of the film for electrodes may be 30 to 50% in the lamination.

According to a sixteenth embodiment, in any one of the thirteenth to fifteenth embodiments, a roll pressing ratio of the film for electrodes may be 20% or less.

According to a seventeenth embodiment, in any one of the thirteenth to sixteenth embodiments, an increase in apparent density of the film for electrodes before and after the lamination with the current collector may be 5 to 30%.

According to an eighteenth embodiment, in any one of the thirteenth to seventeenth embodiments, the lamination may be performed by lamination rolls of 25 to 250° C.

According to a nineteenth embodiment, there is provided an electrode manufactured by the method of any one of the thirteenth to eighteenth embodiments.

According to a twentieth embodiment, there is provided a secondary battery comprising a positive electrode, a negative electrode and a separator interposed between the positive electrode and the negative electrode, wherein at least one of the positive electrode or the negative electrode is defined in any one of the first to twelfth embodiments.

According to a twenty first embodiment, there is provided an energy storage system comprising the secondary battery according to the twentieth embodiment as a unit cell.

Advantageous Effects

The electrode according to an embodiment of the present disclosure is manufactured by uniformly mixing the constituent materials, the active material, the conductive material and the fluorine-containing binder, forming the film for electrodes and laminating the film for electrodes with the current collector, without a process of drying the solvent. Therefore, it may be possible to achieve a uniform binder distribution in the thickness-wise direction, thereby effectively reducing the disadvantages: low adhesion strength caused by the non-uniform binder distribution, the decrease in conductivity on the electrode layer surface and the consequential decline in charge/discharge rate.

DESCRIPTION OF DRAWINGS

The accompanying drawings illustrate an exemplary embodiment of the present disclosure and together with the foregoing disclosure, serve to provide further understanding of the technical features of the present disclosure, and thus, the present disclosure is not construed as being limited to the drawings.

BEST MODE

Hereinafter, the present disclosure will be described in detail to help a full understanding of the present disclosure.

It should be understood that the terms or words used in the specification and the appended claims should not be construed as limited to general and dictionary meanings, but rather interpreted based on the meanings and concepts corresponding to technical aspects of the present disclosure on the basis of the principle that the inventor is allowed to define terms appropriately for the best explanation.

The terms used herein are used to describe the exemplary embodiments, but not intended to be limiting of the present disclosure. As used herein, the singular form is intended to include the plural form as well, unless the context clearly indicates otherwise.

It will be further understood that "comprises" or "includes" when used in this specification, specifies the presence of stated elements and does not preclude the presence or addition of one or more other elements unless expressly stated otherwise.

According to an aspect of the present disclosure, there is provided an electrode comprising:

an electrode current collector; and an electrode layer on the electrode current collector, the electrode layer comprising an active material, a conductive material and a fluorine-containing binder, wherein the electrode layer has a quantified binder ratio (QBR) of 1.1 or less.

The QBR is defined by the following equation:

$$QBR = Bs/Bf,$$

wherein Bs is the average fluorine content in the surface region of the electrode layer within 15% of the total thickness of the electrode layer from the outermost surface of the electrode layer, and Bf is the average fluorine content in the bottom region of the electrode layer within 15% of the total thickness of the electrode layer from the interface between the electrode layer and the current collector.

Figure 1:
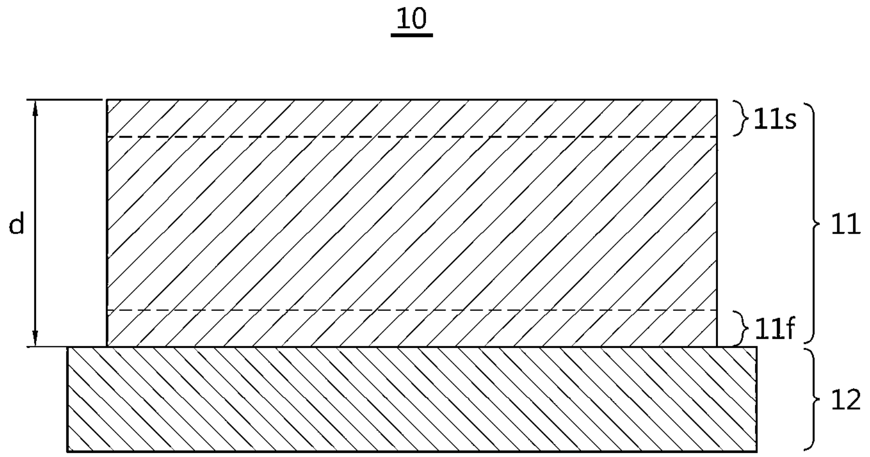
FIG. 1 is a schematic diagram of an electrode according to an embodiment of the present disclosure.

FIG. 1 is a schematic diagram of the electrode according to an embodiment of the present disclosure. Referring to FIG. 1, the electrode 10 comprises the electrode current collector 12, and the electrode layer 11 comprising the active material, the conductive material and the fluorine-containing binder on the electrode current collector 12.

The electrode layer 11 has, based on its total thickness d, an electrode layer surface region 11*s* within 15% of the total thickness d of the electrode layer from the outermost surface of the electrode layer, and an electrode layer bottom region 11*f* within 15% of the total thickness d of the electrode layer from the interface between the electrode layer and the current collector.

In the equation QBR, Bs is the average fluorine content in the electrode layer surface region 11*s*, and Bf is the average fluorine content in the electrode layer bottom region 11*f*. In this instance, QBR may be calculated as follows.

First, a target electrode for QBR calculation is selected, and a cross section of the electrode is prepared using argon ion milling. Subsequently, EDS mapping of the constituent elements in the electrode layer of the electrode cross section is performed using an energy dispersive X-ray spectroscopy (EDS) detector of a scanning electronic microscope (SEM).

Subsequently, a line profile is extracted from the EDS mapping results in the thickness-wise direction of the electrode layer, the average fluorine content Bs of the fluorine-containing binder in the electrode layer surface region and the average fluorine content Bf of the fluorine-containing binder in the electrode layer bottom region are extracted from the extracted line profile results, and QBR is calculated using the following equation:

$$QBR = Bs/Bf$$

In this instance, the electrode layer surface region is a region within 15% of the total thickness d of the electrode layer from the outermost surface of the electrode layer in the thickness-wise direction of the electrode layer, and the electrode layer bottom region is a region within 15% of the total thickness d of the electrode layer from the interface between the electrode layer and the current collector.

Figure 2:
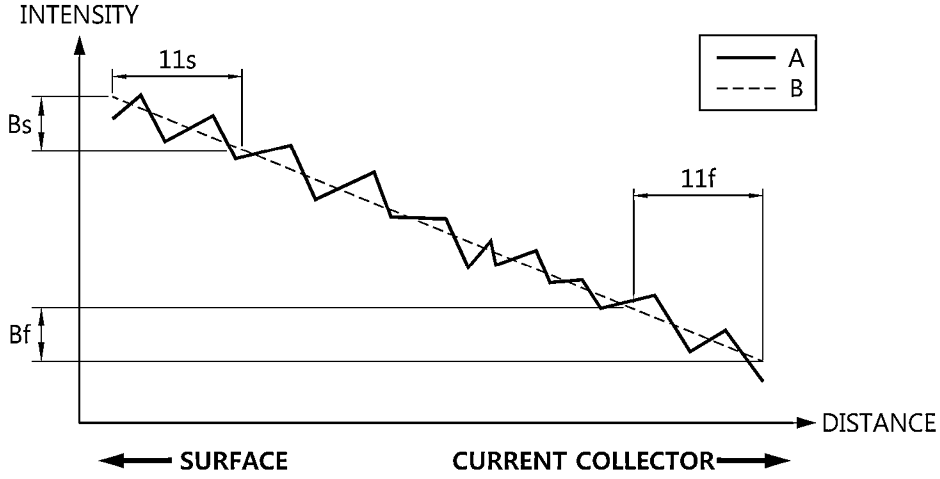
FIG. 2 is a schematic diagram illustrating the calculation of a quantified binder ratio (QBR) value of an electrode layer.

FIG. 2 is a schematic diagram illustrating the calculation of the QBR value of the electrode layer. Referring to FIG. 2, the X-axis indicates the thickness of the electrode layer, i.e., a distance from the surface to the current collector, and the Y-axis indicates the fluorine intensity. The line A indicates the fluorine intensity of the fluorine-containing binder extracted by EDS mapping of fluorine in the electrode layer of the electrode cross section, and the line B is a trend line showing a trend of the line A by locally weighted scatterplot smoothing (LOWESS).

The QBR value is a value that indicates the thickness-wise distribution uniformity of the fluorine-containing binder in the electrode layer through a ratio of the amount of the fluorine-containing binder in the surface region of the electrode layer to the amount of the fluorine-containing binder in the bottom region of the electrode layer. In this instance, the amount of the fluorine-containing binder may be inferred through fluorine contained in the fluorine-containing binder used.

The QBR value is 1.1 or less, and according to an embodiment of the present disclosure, the QBR value may be 0.95 or more, or 0.97 or more, and 1.03 or less, or 1.05 or less. The QBR value may be 0.95 to 1.05.

When the QBR value is larger than 1.1, due to the migration of the fluorine-containing binder to the electrode surface, the amount of the fluorine-containing binder in the surface region of the electrode layer is larger than the amount of the fluorine-containing binder in the bottom region of the electrode layer, resulting in non-uniform binder distribution in the thickness-wise direction of the electrode layer, in which the binder content in the region near the current collector is lower, causing low adhesion strength between the current collector and the electrode layer, the decrease in conductivity on the electrode layer surface and the consequential decline in charge/discharge rate.

According to an embodiment of the present disclosure, the electrode may be a positive electrode or a negative electrode, and the active material may be a positive electrode active material or a negative electrode active material.

The positive electrode active material may include, without limitation, any of lithium transition metal oxides, lithium metal ferrophosphates and metal oxides, and for example, the positive electrode active material may include, but is not limited to, layered compounds such as lithium cobalt oxide ($LiCoO_2$) and lithium nickel oxide ($LiNiO_2$) or compounds with one or more transition metal substitution; lithium manganese oxides such as those represented by the chemical formula of $Li_{1+x}Mn_{2-x}O_4$ (wherein x is 0 to 0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01 to 0.3); lithium manganese composite oxides represented by the chemical formula of $LiMn_{2-x}M_xO_2$ (wherein M is Co, Ni, Fe, Cr, Zn or Ta, and x is 0.01 to 0.1) or $Li_2Mn_3MO_8$ (wherein M is Fe, Co, Ni, Cu or Zn); $LiMn_2O_4$ with partial substitution of alkali earth metal ion for Li in the chemical formula; lithium metal phosphates $LiMPO_4$ (wherein M is Fe, Co, Ni or Mn), $LiNi_{1-x-y-z}Co_xM1_yM2_zO_2$ (wherein each of M1 and M2 independently represents any one selected from the group consisting of Al, Ni, Fe, Mn, V, Cr, Ti, W, Ta, Mg and Mo, each of x, y and z independently represents the atomic fraction of the elements in the oxide, and $0<x<0.5$, $0<y<0.5$, $0<z<0.5$ and $0<x+y+z\leq1$); disulfide compounds; and $Fe_2(MoO_4)_3$.

Additionally, the negative electrode active material include: carbon such as non-graphitizable carbon or graphite-based carbon; metal composite oxides such as $Li_xFe_2O_3$ ($0\leq x\leq1$), $Li_xWO_2$ ($0\leq x\leq1$) and $Sn_xMe_{1-x}Me'_yO_z$ (Me: Mn, Fe, Pb, Ge; Me': Al, B, P, Si, elements of Group 1, 2 or 3 in the Periodic Table, halogen; $0<x\leq1$; $1\leq y\leq3$; $1\leq z\leq8$); lithium metals; lithium alloys; silicon-based alloys; tin-based alloys; silicon oxides such as SiO, SiO/C and $SiO_2$; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers such as polyacetylene; and Li—Co—Ni based materials.

According to an embodiment of the present disclosure, the electrode may be a positive electrode. Therefore, specifically, the active material may be a positive electrode active material, and more specifically, may include lithium transition metal oxides, lithium nickel-manganese-cobalt oxides, lithium nickel-manganese-cobalt oxides with partial substitution of Al or other transition metals and lithium ferrophosphates.

The conductive material may include, without limitations, any material having conductive properties while not causing any chemical change in the corresponding battery, and for example, may include at least one of carbon-based materials, metal materials (metal powder or metal fibers), conductive whiskers, conductive metal oxides or conductive polymers. Examples of the carbon-based materials may include natural graphite, artificial graphite, graphene, carbon black, denka black, acetylene black, ketjen black, super-P, channel black, furnace black, lamp black, thermal black, carbon nanotubes, graphite nanofibers and carbon nanofibers, and examples of the metal materials may include copper, nickel, aluminum and silver, examples of the conductive whiskers may include zinc oxide whiskers, calcium carbonate whiskers, titanium dioxide whiskers, silicon oxide whiskers, silicon carbide whiskers, aluminum borate whiskers, magnesium borate whiskers, potassium titanate whiskers, silicon nitride whiskers, silicon carbide whiskers and alumina whiskers, examples of the conductive metal oxides may include titanium oxide, and examples of the conductive polymers may include polyphenylene derivatives, used alone or in combination.

According to an embodiment of the present disclosure, for uniform mixing and improved conductivity, the conductive material may comprise at least one selected from the group consisting of activated carbon, graphite, carbon black and carbon nanotubes, and more specifically, carbon black or activated carbon.

The fluorine-containing binder may include a fluorine-containing polymer, and specifically, polytetrafluoroethylene (PTFE). Additionally, the fluorine-containing polymer may comprise polytetrafluoroethylene alone, or in combination with at least one of PVDF-based copolymers such as polyvinylidene fluoride (PVDF) and polyvinylidene fluoride-co-hexafluoropropylene (PVDF-HFP).

In an embodiment of the present disclosure, the degree of crystallinity of the fluorine-containing binder in the electrode layer may be 10% or less, or the degree of crystallinity of the fluorine-containing binder in the electrode layer may be 0% to 10%, or 0% to 5%, or 0% to 3%, or 0% to 1.2%, or 0% to 0.5%, or 0.5 to 1.2%.

In an embodiment of the present disclosure, the degree of crystallinity Xc may be measured through differential scanning calorimetry (DSC) on the basis of the temperature (peak temperature) at the time when the enthalpy of crystallization is at the maximum. Specifically, the degree of crystallinity is a percentage ratio obtained by dividing a melting enthalpy ($\Delta H_m$) value actually measured by DSC by a melting enthalpy ($\Delta H_m^0$) value (the equilibrium heat of fusion) of a theoretically perfect crystal (degree of crystallinity 100%), and may be calculated by the following relationship equation 1. Here, for details about the melting enthalpy value ($\Delta H_m$) of a theoretically perfect crystal, reference may be made to polymer handbook (J. Brandrup et al., 2003) or Polymer Journal. For example, the melting enthalpy value of a theoretically perfect crystal of PTFE is 85.4 J/g (Polymer Journal Vol. 46 (2005) 8872~8882). Meanwhile, thermal analysis for polymer by DSC may be commonly measured and calculated in accordance with ASTM D3418-21.

$$Xc(\%) = (\Delta H_m \div \Delta H_m^0) \times 100 \quad \text{[Relationship equation 1]}$$

According to an embodiment of the present disclosure, the amount of the active material may be 85 to 98 parts by weight, the amount of the conductive material may be 0.5 to 5 parts by weight, and the amount of the fluorine-containing binder may be 0.5 to 10 parts by weight. Additionally, the amount of the active material may be 90 to 98 parts by weight, the amount of the conductive material may be 0.5 to 5 parts by weight, and the amount of the fluorine-containing binder may be 0.5 to 5 parts by weight.

When the amount of each of the active material, the conductive material and the fluorine-containing binder satisfies the above-described range, the fluorine-containing binder may undergo sufficient fibrilization during the subsequent kneading process to form a mixture agglomerate, which in turn, goes through a pulverization process to form a mixed powder, making it easy to form an electrode film, and making it possible to ensure the physical properties of the electrode film and secure the amount of the active material, thereby preventing capacity fading and ensuring sufficient conductivity.

In some instances, meanwhile, the filler for suppressing electrode swelling may be additionally fed into the electrode layer, and the filler may include, without limitation, any type of fibrous material that does not cause any chemical change in the corresponding battery, and for example, olefin-based polymers, such as polyethylene or polypropylene; and fibrous materials, such as glass fibers or carbon fibers.

The current collector may include, without limitation, any type of material having high conductivity while not causing any chemical change in the corresponding battery, and for example, may include stainless steel, aluminum, nickel, titanium, sintered carbon, copper or aluminum or stainless steel treated with carbon, nickel, titanium or silver on the surface. Additionally, the current collector may have micro-texture on the surface to increase the adhesion strength of the positive electrode active material, and may come in various forms, for example, films, sheets, foils, nets, porous structures, foams and non-woven fabrics.

Further, the current collector may be coated with a conductive primer layer in whole or in part to reduce the surface resistance and improve the adhesion strength. Here, the conductive primer layer may comprise a conductive material and a binder. The conductive material may include, without limitation, any type of material having conductive properties, and for example, may include carbon-based materials, metal materials (metal powder or metal fibers), conductive whiskers, conductive metal oxides and conductive polymers. Examples of the carbon-based materials may include natural graphite, artificial graphite, graphene, carbon black, denka black, acetylene black, ketjen black, Super-P, channel black, furnace black, lamp black, thermal black, carbon nanotubes, graphite nanofibers and carbon nanofibers, examples of the metal materials may include copper, nickel, aluminum and silver, examples of the conductive whiskers may include zinc oxide whiskers, calcium carbonate whiskers, titanium dioxide whiskers, silicon oxide whiskers, silicon carbide whiskers, aluminum borate whiskers, magnesium borate whiskers, potassium titanate whiskers, silicon nitride whiskers, silicon carbide whiskers and alumina whiskers, examples of the conductive metal oxides may include titanium oxide, and examples of the conductive polymers may include polyphenylene derivatives, used alone or in combination.

The binder may be a fluorine-based binder (including PVDF and PVDF copolymers) or an acrylic binder, which is soluble in a solvent, or may comprise an aqueous binder such as styrene butadiene rubber (SBR).

The flexibility of the electrode may be evaluated as bending resistance.

According to an embodiment of the present disclosure, the bending resistance of the electrode may be 10 mm Φ or less, or 8 mm Φ or less, or 5 mm Φ or less, or 2 to 8 mm Φ, or 2 to 5 mm Φ, or 2 to 4 mm Q.

The bending resistance may be evaluated in accordance with the method of the measurement standard JIS K5600-5-1, and specifically, the method comprises bringing the prepared electrode into contact with measurement rods of various diameters, pulling up two ends, and determining whether cracking occurs and measuring the minimum diameter at which cracking does not occur.

According to an embodiment of the present disclosure, the bending resistance of the electrode may be evaluated by preparing a rectangular electrode sample of 100 mm×50 mm; preparing measurement rods of 2, 3, 4, 5, 6, 8, 10, 12, 16, 20, 25, 32 mm in diameter, bringing the electrode sample into contact with the measurement rod having the largest diameter, determining whether cracking occurs in the mixture film of the electrode sample when pulling up two ends of the electrode sample; and when cracking does not occur in the previous step, determining whether cracking occurs in the mixture film of the electrode sample in the same way as the previous step using the measurement rod having the next largest diameter, and repeatedly performing this process to determine, as the bending resistance, the minimum diameter value of the measurement rod at which cracking does not occur in the mixture film of the electrode sample.

According to an embodiment of the present disclosure, the binder may bind the active material and the conductive material by fibrilization. The electrode may comprise the fibrilized binder as the means for binding the active material and the conductive material, and the fibrilized binder less breaks than unfibrilized binders and is highly stretchable in the lengthwise direction, thereby improving the flexibility of the electrode layer and the electrode comprising the same. The fibrilization process of the binder will be described in detail in the electrode manufacturing method as described below.

According to an aspect of the present disclosure, there is provided a method for manufacturing an electrode according to the present disclosure, the method comprising the steps of:

preparing a mixture comprising an active material, a conductive material and a fluorine-containing binder;

kneading the mixture in a range between 70° C. and 200° C. under the pressure that is equal to or higher than the atmospheric pressure to prepare a mixture agglomerate;

pulverizing the mixture agglomerate to obtain a mixed powder for electrodes;

feeding the mixed powder for electrodes in between a plurality of rolls and performing calendering to form a film for electrodes; and laminating the film for electrodes onto a metal current collector.

Hereinafter, the method for manufacturing the electrode according to the present disclosure will be described in more detail.

First, the mixture including the active material, the conductive material and the fluorine-containing binder is prepared.

In this instance, the mixing for preparing the mixture is performed for uniform distribution of the active material, the conductive material and the fluorine-containing binder resin, and since the materials are mixed in powder state, any method for simply mixing the materials may be used, and the mixing may be performed by various methods. However, since the electrode of the present disclosure is manufactured by a dry method without using a dispersion medium, the mixing may be performed in a dry mixing manner, and the materials may be fed into, for example, a blender and mixed together.

Additionally, the mixing may be performed in a mixer at 5,000 rpm to 20,000 rpm for 30 seconds to 2 minutes, and specifically at 10,000 rpm to 15,000 rpm for 30 seconds to 1 minute, to ensure uniformity.

The fluorine-containing binder may be micro-fibrilized by the step of preparing the mixed powder, and may include any type of binder containing fluorine to calculate QBR as described above. The micro-fibrilization refers to disintegration of a polymer at the microscale, and may be performed, for example, using mechanical shear forces. Specific examples of the fluorine-containing binder may include a fluorine-containing polymer as described above, and specifically, may include polytetrafluoroethylene (PTFE) alone, or in combination with at least one of PVDF-based copolymers such as polyvinylidene fluoride (PVDF) and polyvinylidene fluoride-co-hexafluoropropylene (PVDF-HFP).

Subsequently, the mixture is kneaded in the range between 70° C. and 200° C. under the pressure that is equal to or higher than atmospheric pressure to prepare a mixture agglomerate.

In the known technology, high-shear mixing such as jet milling was performed for the fibrilization of the binder resin, and the mixing may break down the active material into very fine powder and fracture in resultant fibers may occur. According to the present disclosure, low-shear kneading is used instead of high-shear mixing to solve the problems.

The kneading is not limited to a particular method. In a specific embodiment of the present disclosure, the kneading may be performed through a kneader.

The kneading is used to bind or hold the active material and conductive material powder together by the fibrilization of the fluorine-containing binder to form a mixture agglomerate having 100% solids.

Specifically, the kneading may be controlled to the speed of 10 rpm to 100 rpm. For example, the kneading may be controlled to the speed of 20 rpm or more or 70 rpm or less within the above-described range. The kneading may be performed for 3 minutes to 30 minutes. For example, the kneading may be performed at the speed of 40 rpm to 70 rpm for 3 minutes to 20 minutes within the above-described ranges. Meanwhile, the shear rate for the kneading may be controlled in a range between 10/s and 500/s. In a specific embodiment of the present disclosure, the kneading may be performed for 3 minutes to 20 minutes, and the shear rate may be controlled in a range between 30/s and 100/s.

Additionally, the kneading step may be performed in the condition of high temperature and pressure that is equal to or higher than atmospheric pressure, and more specifically, in the condition of pressure that is higher than the atmospheric pressure.

More specifically, the kneading may be performed on the mixture in a range between 70° C. and 200° C., and specifically 90° C. and 150° C.

When the kneading is performed at low temperature outside of the above-described temperature range, it results in poor fibrilization and agglomeration of the fluorine-containing binder by the kneading, thereby failing to easily form a film during the calendering. On the other hand, when the kneading is performed at too high temperature, the fibrilization of the fluorine-containing binder occurs rapidly, and the resultant fibers may be broken by excessive shear force, undesirably.

Additionally, the kneading may be performed under the pressure (cover pressure) that is equal to or higher than the atmospheric pressure, specifically 1 to 100 atm, and more specifically 2 to 80 atm, or may be performed under the pressure of 1 kgf/cm$^2$ to 100 kgf/cm$^2$ or 2 kgf/cm$^2$ to 80 kgf/cm$^2$. When the above-described pressure range is satisfied, it may be possible to prevent the fiber fracture and extremely high density of the mixture agglomerate caused by the application of excessive shear force and pressure. That is, according to the present disclosure, it may be possible to achieve the intended effect of the present disclosure when low-shear mixing is performed in the condition of high temperature and the pressure that is equal to or higher than the atmospheric pressure, instead of high-shear mixing.

Subsequently, the mixture agglomerate is pulverized to obtain the mixed powder for electrodes.

Specifically, the mixture agglomerate prepared through the kneading may directly go through calendering, but in this case, the mixture agglomerate may be pressed down to form a thin film, causing problems with extremely high density of the film or failure to obtain a non-uniform film. According to the present disclosure, the resultant mixture agglomerate goes through a pulverization step.

In this instance, the pulverization step may be performed, for example, using a blender or a grinder, but is not limited thereto, and specifically, the pulverization step may be performed at the speed of 5,000 rpm to 20,000 rpm for 30 seconds to 10 minutes, and specifically at the speed of 10,000 rpm to 18,000 rpm for 30 seconds to 2 minutes.

When the pulverization speed and time are satisfied, the pulverization is adequately performed, thereby forming a powder having a size suitable for film formation and preventing the production of a large amount of fine powder from the mixture agglomerate. If necessary, a classification step may be performed to filter out a powder having a larger or smaller size than a predetermined size.

Subsequently, the mixed powder for electrodes is fed in between a plurality of rolls, followed by calendering to form a film for electrodes.

Figure 3:
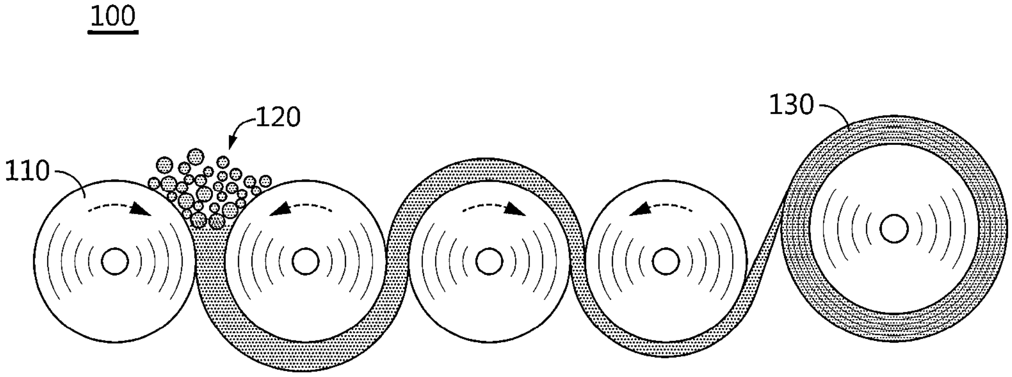
FIG. 3 is a diagram illustrating a process of preparing a film for electrodes according to an embodiment of the present disclosure.

Referring to FIG. 3, the process 100 of forming the film for electrodes is performed using the plurality of rolls 110 spaced apart from each other, whereby the mixed powder 120 for electrodes obtained in the preceding step is fed in between the adjacent rolls, and the rolls 110 are rotated in the opposite directions to press the mixed powder 120 to form into a sheet or film shape 130 through a powder sheeting step, followed by calendering multiple times to obtain a final film for electrodes having a target thickness.

Specifically, the calendering refers to shaping the mixed powder for electrodes into a film, and for example, may be the step of forming the mixed powder for electrodes into a film shape having an average thickness of 50 μm to 300 μm.

In this instance, for example, the calendering may be performed by the rolls facing each other, and in this instance, the roll temperature may be 50° C. to 200° C., and the rotational speed ratio of the rolls may be controlled in a range between 1.0 and 5.0.

After the calendering step is performed, a dry electrode film that serves as a mixed electrode material may be prepared. The dry electrode film may be referred to as a 'free-standing film'.

The resultant dry electrode film contains no solvent, and thus is hardly flowable, which makes it easy to handle and makes it possible to form into a desired shape for use in the manufacture of electrodes of various shapes. Additionally, when the dry electrode film of the present disclosure is used to manufacture electrodes, a drying step for removing a solvent may be eliminated, thereby significantly improving the efficiency of the electrode manufacturing process and solving the problems that have arisen in the manufacture of dry electrodes, such as chipping of the active material and fracture of the fibrilized fluorine-containing binder.

Meanwhile, in the present disclosure, the dry electrode film may have a porosity of 20% to 50%, and the porosity may be controlled in the above-described range, and preferably to 40% or less or 30% or less in the above-described range. When the porosity satisfies the above-described range, electrolyte solution wetting may be made easy, thereby improving the life and output characteristics, and there is no need to increase the volume to achieve the same capacity, thereby improving the energy density compared to volume. In an embodiment of the present disclosure, the porosity may be calculated by the following equation using the actual density calculated based on the actual density and composition of each component after measuring the apparent density of the dry electrode film:

$$\text{Porosity (\%)} = \{1 - (\text{Apparent density}/\text{Actual density})\} \times 100$$

Subsequently, the film for electrodes is laminated onto the metal current collector.

The lamination step may be the step of pressing and attaching the film for electrodes obtained in the preceding step onto the current collector to a predetermined thickness. The lamination may also be performed by lamination rolls, and in this instance, the lamination rolls may be maintained at the temperature of 25 to 250° C.

According to an embodiment of the present disclosure, the film for electrodes may have a compression ratio of 30 to 50%, 35 to 50%, or 40 to 50%.

The compression ratio of the film for electrodes may be defined as a ratio of compressed thickness of the film for electrodes when laminated, and may be represented by the following Equation 3:

$$\text{Compression ratio (\%)} = T_p / T_1 \times 100 \quad \text{[Equation 3]}$$

wherein $T_p$ denotes the pressed thickness of the film for electrodes in the lamination step, and $T_1$ denotes the thickness of the film for electrodes before the lamination step.

In the present disclosure, the compression ratio may be adjusted to the specific range in the lamination step, thereby providing the optimal density and porosity of the film for electrodes and high adhesion strength between the film for electrodes and the current collector.

When the compression ratio of the film for electrodes satisfies the range between 30 and 50%, due to the sufficient pressure applied to the film for electrodes, it may be possible to enhance the adhesion strength between the film for electrodes and the current collector, prevent the separation of the film for electrodes from the current collector after the lamination process, and avoid lower porosity than the target porosity or damage to the current collector due to the increased density of the film for electrodes more than necessary.

In an embodiment of the present disclosure, when the film for electrodes is laminated onto two surfaces of the current collector, the compression ratio (%) of the above Equation 3 may be rewritten as the following Equation 4:

$$30 \leq (T_1 + 0.5T_c - 0.5T_{gap}) / T_1 \times 100 \leq 50 \quad \text{[Equation 4]}$$

wherein $T_1$ denotes the thickness of the film for electrodes before the lamination step, $T_c$ denotes the thickness of the current collector, and $T_{gap}$ denotes the distance between first and second press rolls.

Additionally, the roll pressing ratio of the film for electrodes subjected to the lamination step may be in a range of 20% or less, 18% or less, 15% or less, 5% to 15%, 6% to 15%, 7% to 15%, or 9% to 13%.

Here, the roll pressing ratio may be defined as a ratio of the thickness of the film for electrodes after the lamination step to the thickness of the film for electrodes before the lamination step, and may be represented by the following Equation 5:

$$\text{Roll pressing ratio (\%)} = (T_1 - T_2) / T_1 \times 100 \quad \text{[Equation 5]}$$

wherein $T_1$ denotes the thickness of the film for electrodes before the lamination step, and $T_2$ denotes the thickness of the film for electrodes after the lamination step.

When the roll pressing ratio satisfies the above-described range, it may be possible to achieve the optimal density and porosity of the film for electrodes and adhesion strength between the film for electrodes and the current collector.

An increase in apparent density of the film for electrodes before and after lamination with the current collector may be represented by the following Equation 6:

$$\text{Increase in apparent density (\%)} = (D_2 - D_1) / D_1 \times 100 \quad \text{[Equation 6]}$$

wherein $D_1$ denotes the apparent density (g/cm$^3$) of the film for electrodes before the lamination step, and $D_2$ denotes the apparent density (g/cm$^3$) of the film for electrodes after the lamination step.

The increase in apparent density of the film for electrodes before and after lamination with the current collector may be 5 to 30%, 7 to 25%, or 10 to 20%. In this instance, each of $D_1$ and $D_2$ may range from 2.75 g/cm$^3$ to 3.5 g/cm$^3$. Meanwhile, when the increase in apparent density of the film for electrodes satisfies the above-described range, it may be possible to improve the adhesion strength between the film for electrodes and the current collector and prevent the porosity outside of the target range or damage to the positive electrode active material or the current collector.

The apparent density of the film for electrodes before and after lamination with the current collector may be calculated by measuring the weight and thickness of the film for electrodes before lamination, measuring the weight and thickness of the electrode after lamination, and subtracting the weight and thickness of the current collector from the weight and thickness of the film.

Additionally, the active material loading amount of the dry electrode film may be 3 mAh/cm$^2$ to 15 mAh/cm$^2$, and specifically 4 mAh/cm$^2$ to 10 mAh/cm$^2$.

Here, the active material loading amount is a value calculated by the following Equation 7:

$$\text{Active material loading amount } (mAh/\text{cm}^2) = \text{Capacity } (mAh/g) \text{ of active material} \times \text{Weight ratio } (wt\%) \text{ of active material in dry electrode film} \times \text{Weight per unit area } (g/\text{cm}^2) \text{ of dry electrode film} \quad \text{[Equation 7]}$$

Additionally, the interfacial resistance between the dry electrode film and the current collector may be 5 Ω·cm$^2$ or less, and specifically 2 Ω·cm$^2$ or less. Here, the interfacial resistance may be calculated by applying an electric current of 100 μA to the electrode using a multiprobe (MP) resistance measurement method, and measuring a resistance value between the dry electrode film and the current collector layer using a potential difference measured between the multiple probes. When the interfacial resistance satisfies the above-described range, it may be possible to improve the battery performance of a secondary battery that will be fabricated.

Figure 4:
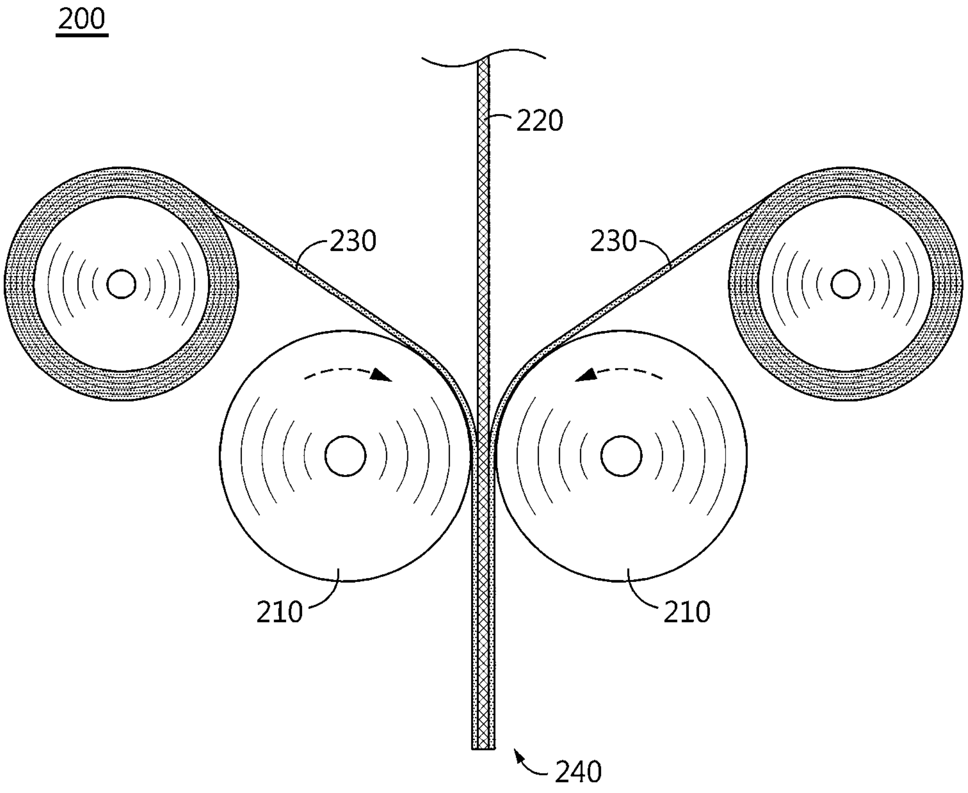
FIG. 4 is a diagram illustrating an electrode lamination process according to an embodiment of the present disclosure.

FIG. 4 is a diagram illustrating the step of laminating the film for electrode onto two surfaces of the current collector according to an embodiment of the present disclosure. In other words, in the lamination step 200, the film 230 for electrodes obtained in the preceding step may be roll-pressed and attached to the current collector 220 to a predetermined thickness using the pair of lamination rolls 210 to finally obtain the electrode 240.

According to another embodiment of the present disclosure, there is provided a dry electrode manufactured by the method for manufacturing the same. Additionally, there are provided a secondary battery comprising the dry electrode, wherein the dry electrode is a positive electrode, and an electrode assembly comprising the positive electrode, a negative electrode and a separator is received in a battery case (a cylindrical case, a prismatic case, a pouch, or the like) together with a lithium-containing non-aqueous electrolyte, and an energy storage system comprising the secondary battery as a unit cell.

In this instance, the detailed structure of the secondary battery and the energy storage system are well known, and its description is omitted.

Meanwhile, according to an embodiment of the present disclosure, there is provided an apparatus for manufacturing the dry electrode, comprising: a blender configured to mix the raw materials comprising the active material, the conductive material and the fluorine-containing binder; a kneader configured to knead the mixture to prepare the mixture agglomerate; a pulverizer configured to pulverize the mixture agglomerate to form the mixed powder for electrodes; a calendar configured to form the mixed powder into the dry electrode film; and lamination rolls configured to laminate the dry electrode film on at least one surface of the current collector.

The blender is a mixer configured to mix the raw materials, and as described above, the raw materials may be mixed at the speed of 1,000 rpm to 10,000 rpm.

The kneader is configured to fibrilize the fluorine-containing binder and disperse the raw materials, and the mixture may be obtained in the form of the mixture agglomerate through kneading in the kneader. In this instance, the kneader for attaining the result according to the present disclosure may be set to the range between 70° C. and 200° C. and the pressure condition that is equal to or higher than the atmospheric pressure. Specifically, the kneader may be set to the range between 90° C. and 180° C. and the pressure condition of 1 to 100 atom, and more specifically 2 to 80 atm.

The pulverizer is configured to pulverize the mixture agglomerate to form the mixed powder for electrodes, and may include a blender or a grinder.

The calendar is configured to form the mixed powder for electrodes into a film shape, and for example, the calendar may be a pair of rollers disposed on opposite sides, and the film thickness may be adjusted from the distance between the rollers.

The lamination rolls play a role in attaching and roll-pressing the dry electrode film formed by the calendar onto at least one surface of the current collector.

The porosity of the dry electrode film according to the present disclosure may be determined by the calendar and the lamination rolls.

In other words, the apparatus for manufacturing the dry electrode according to the present disclosure is characterized by comprising the kneader and the pulverizer.

The detailed structure of the blender, the kneader, the calendar and the lamination rolls are well known, and its detailed description is omitted.

Embodiments will be described in detail to provide a detailed description of the present disclosure. However, the embodiments according to the present disclosure may be modified in many other forms and it should not be construed as limiting the scope of the present disclosure to the following embodiments. The embodiments of the present disclosure are provided to convey a thorough description of the present disclosure to those skilled in the art.

Example 1

96 g of lithium nickel cobalt manganese aluminum oxide (NCMA, $Li[Ni_{0.88}Co_{0.07}Mn_{0.04}]Al_{0.01}O_2$) as a positive electrode active material, 1 g of carbon black as a conductive material and 3 g of polytetrafluoroethylene (PTFE) as a fluorine-containing binder were fed into a blender and mixed at 10,000 rpm for 1 minute to prepare a mixture. The temperature of a kneader was stabilized at 150° C., and the mixture was put into the kneader which in turn, went into operation under the cover pressure of 2 kgf/cm$^2$ at the speed of 50 rpm for 5 minutes to obtain a mixture agglomerate. The mixture agglomerate was fed into the blender, pulverized at 10,000 rpm for 30 seconds, and classified using a sieve having 1 mm openings to obtain a mixed powder for electrodes. Subsequently, the resultant mixed powder for electrodes was fed into a lab calendar (roll diameter: 88 mm, roll temperature: 100° C.) to form a film for electrodes. Two sheets of the films for electrodes were placed on two surfaces of an aluminum foil (19 μm) coated with a conductive primer layer comprising carbon black and an acrylic binder mixed at a weight ratio of 5:6, and laminated through lamination rolls (compression rolls) maintained at 150° C. to manufacture an electrode (a positive electrode).

In this instance, in the lamination step, the compression ratio of the film for electrodes was 35.6%, and the roll pressing ratio of the film for electrodes was 16.4%.

In this instance, the compression ratio of the film for electrodes is defined as a ratio of the compressed thickness of the film for electrodes when laminated, and was calculated by the following Equation 1:

$$\text{Compression ratio}(\%) = T_p / T_1 \times 100 \qquad \text{[Equation 1]}$$

wherein $T_p$ denotes the pressed thickness of the film for electrodes in the lamination step, and $T_1$ denotes the thickness of the film for electrodes before the lamination step.

In addition, the roll pressing ratio of the film for electrodes is defined as a ratio of the thickness of the film for electrodes after the lamination step to the thickness of the film for electrodes before the lamination step, and was calculated by the following Equation 3:

$$\text{Roll pressing ratio}(\%) = (T_1 - T_2) / T_1 \times 100 \qquad \text{[Equation 3]}$$

wherein $T_1$ denotes the thickness of the film for electrodes before the lamination step, and $T_2$ denotes the thickness of the film for electrodes after the lamination step.

The total thickness of the finally manufactured electrode was 175 μm, the thickness of the electrode active material layer was 77 μm, and the porosity of the electrode was 25.1%.

In this instance, the actual porosity of the electrode was calculated by the following equation using the actual density calculated based on the actual density and composition of each component after measuring the apparent density of the electrode active material layer by subtracting the volume and weight of the current collector from the volume and weight of the electrode:

$$\text{Porosity}(\%) = \{1 - (\text{Apparent density} / \text{Actual density})\} \times 100$$

The increase in apparent density of the film for electrodes was 19% before and after lamination with the current collector.

In this instance, the increase in apparent density of the film for electrodes before and after lamination with the current collector was calculated using the following Equation 4, and the apparent density of the film for electrodes before and after lamination with the current collector was calculated by measuring the weight and thickness of the film for electrodes before lamination, measuring the weight and thickness of the electrode after lamination, and subtracting the weight and thickness of the current collector from the weight and thickness of the film:

$$\text{Increase in apparent density (\%)} = (D_2 - D_1)/D_1 \times 100 \quad \text{[Equation 4]}$$

wherein $D_1$ denotes the apparent density (g/cm$^3$) of the film for electrodes before the lamination step, and $D_2$ denotes the apparent density (g/cm$^3$) of the film for electrodes after the lamination step.

Example 2

96 g of lithium nickel cobalt manganese aluminum oxide (NCMA, $Li[Ni_{0.88}Co_{0.07}Mn_{0.04}]Al_{0.01}O_2$) as a positive electrode active material, 1 g of carbon black as a conductive material and 3 g of polytetrafluoroethylene (PTFE) as a fluorine-containing binder were fed into a blender and mixed at 10,000 rpm for 2 minutes to prepare a mixture. The temperature of a kneader was stabilized at 150° C., and the mixture was put into the kneader which in turn, went into operation under the cover pressure of 2 kgf/cm$^2$ at the speed of 50 rpm for 5 minutes to obtain a mixture agglomerate. The mixture agglomerate was fed into the blender, pulverized at 10,000 rpm for 30 seconds, and classified using a sieve having 1 mm openings to obtain a mixed powder for electrodes. Subsequently, the resultant mixed powder for electrodes was fed into a lab calendar (roll diameter: 88 mm, roll temperature: 100° C.) to form a film for electrodes. Two sheets of the films for electrodes were placed on two surfaces of an aluminum foil (19 μm) coated with a conductive primer layer comprising carbon black and an acrylic binder mixed at a weight ratio of 5:6, and laminated through lamination rolls (compression rolls) maintained at 150° C. to manufacture an electrode (a positive electrode).

In this instance, in the lamination step, the compression ratio of the film for electrodes was 35.1%, and the roll pressing ratio of the film for electrodes was 16.0%.

Additionally, the total thickness of the finally manufactured electrode was 174 μm, the thickness of the electrode active material layer was 77.5 μm, and the porosity of the electrode was 25.6%.

The increase in apparent density of the film for electrodes was 18% before and after lamination with the current collector.

Example 3

96 g of lithium nickel cobalt manganese aluminum oxide (NCMA, $Li[Ni_{0.88}Co_{0.07}Mn_{0.04}]Al_{0.01}O_2$) as a positive electrode active material, 1 g of carbon black as a conductive material and 3 g of polytetrafluoroethylene (PTFE) as a fluorine-containing binder were fed into a blender and mixed at 10,000 rpm for 1 minute to prepare a mixture. The temperature of a kneader was stabilized at 150° C., and the mixture was put into the kneader which in turn, went into operation under the cover pressure of 2 kgf/cm$^2$ at the speed of 25 rpm for 5 minutes to obtain a mixture agglomerate. The mixture agglomerate was fed into the blender, pulverized therein at 10,000 rpm for 30 seconds, and classified using a sieve having 1 mm openings to obtain a mixed powder for electrodes. Subsequently, the resultant mixed powder for electrodes was fed into a lab calendar (roll diameter: 88 mm, roll temperature: 100° C.) to form a film for electrodes. Two sheets of the films for electrodes were placed on two surfaces of an aluminum foil (19 μm) coated with a conductive primer layer comprising carbon black and an acrylic binder mixed at a weight ratio of 5:6, and laminated through lamination rolls (compression rolls) maintained at 150° C. to manufacture an electrode (a positive electrode).

In this instance, in the lamination step, the compression ratio of the film for electrodes was 36.0%, and the roll pressing ratio of the film for electrodes was 16.8%.

Additionally, the total thickness of the finally manufactured electrode was 176 μm, the thickness of the electrode active material layer was 78.5 μm, and the porosity of the electrode was 24.8%.

The increase in apparent density of the film for electrodes was 18% before and after lamination with the current collector.

Comparative Example 1

First, 300 g of lithium nickel cobalt manganese aluminum oxide (NCMA, $Li[Ni_{0.88}Co_{0.07}Mn_{0.04}]Al_{0.01}O_2$) as a positive electrode active material, 0.7 g of carbon black as a conductive material and 1.56 g of polyvinylidene fluoride (PVDF) as a fluorine-containing binder were fed into a mixer together with N-methyl pyrrolidone (NMP) as a dispersion medium and mixed at 30,000 rpm for 60 minutes to prepare a slurry mixture (The resultant slurry had the solids content of 70% and the viscosity of about 8,000 to 20,000 cps). The resultant slurry was dropped onto an aluminum foil (19 μm) and uniformly coated using an applicator (50 to 300 μm). The uniformly coated slurry was put into a drying chamber of 100° C. to evaporate the dispersion medium, and it was determined if a target loading was satisfied. Likewise, the coating and drying was performed on the rear surface of the current collector. The resultant coated electrode was roll-pressed to a target thickness and a target porosity using a roll press to manufacture an electrode (a positive electrode).

The total thickness of the finally manufactured electrode was 174 μm, the thickness of the electrode active material layer was 76 μm, and the porosity of the electrode was 25.2%.

Comparative Example 2

96 g of lithium nickel cobalt manganese aluminum oxide (NCMA, $Li[Ni_{0.88}Co_{0.07}Mn_{0.04}]Al_{0.01}O_2$) as a positive electrode active material, 1 g of carbon black as a conductive material and 3 g of polytetrafluoroethylene (PTFE) as a fluorine-containing binder were fed into a blender and mixed at 10,000 rpm for 1 minute to prepare a mixture. The temperature of a kneader was stabilized at 150° C., and the mixture was put into the kneader which in turn, went into operation under the cover pressure of 2 kgf/cm$^2$ at the speed of 10 rpm for 1 minute to obtain a mixture agglomerate. The mixture agglomerate was fed into the blender, pulverized at 10,000 rpm for 30 seconds, and classified using a sieve having 1 mm openings to obtain a mixed powder for electrodes. Subsequently, the resultant mixed powder for electrodes was fed into a lab calendar (roll diameter: 88 mm, roll temperature: 100° C.) to form a film for electrodes. Two sheets of the films for electrodes were placed on two surfaces of an aluminum foil (19 μm) coated with a conductive primer layer comprising carbon black and an acrylic binder mixed at a weight ratio of 5:6, and laminated through lamination rolls (compression rolls) maintained at 150° C. to manufacture an electrode (a positive electrode).

In this instance, in the lamination step, the compression ratio of the film for electrodes was 37.5%, and the roll pressing ratio of the film for electrodes was 17.7%.

Additionally, the total thickness of the finally manufactured electrode was 178 μm, the thickness of the electrode active material layer was 79.5 μm, and the porosity of the electrode was 26.4%.

The increase in apparent density of the film for electrodes was 20% before and after lamination with the current collector.

Comparative Example 3

96 g of lithium nickel cobalt manganese aluminum oxide as a positive electrode active material, 1 g of carbon black as a conductive material and 3 g of polytetrafluoroethylene (PTFE) as a fluorine-containing binder were fed into a blender and mixed at 5,000 rpm for 20 minutes to prepare a mixed powder for electrodes. Subsequently, the resultant mixed powder for electrodes was fed into a lab calendar (roll diameter: 88 mm, roll temperature: 100° C.) with an attempt to form a film for electrodes, but it was not easy to feed into the lab calendar, thereby failing to form a film.

Performance Evaluation

Each of the electrodes prepared in Examples 1 to 3 and Comparative Examples 1 and 2 and secondary batteries comprising the electrodes were evaluated as follows, and the results are shown in the following Tables 1 and 2.

In this instance, the secondary batteries comprising the electrodes prepared in Examples 1 to 3 and Comparative Examples 1 and 2 were manufactured as follows.

Lithium metal was deposited on a coper foil to the thickness of 70 μm to obtain a negative electrode.

Each electrode prepared in Examples 1 to 3 and Comparative Examples 1 and 2 was used as a positive electrode, and a polyethylene membrane (thickness: 20 μm) was interposed between the positive electrode and the negative electrode to make an electrode assembly. The electrode assembly was received in a battery case, a liquid electrolyte solution comprising 1M $LiPF_6$ dissolved in a mixed solvent containing ethylene carbonate, dimethylene carbonate and diethyl carbonate at a volume ratio of 1:2:1 was injected and the battery case was sealed to manufacture a secondary battery.

(1) Quantified Binder Ratio (QBR)

Argon (Ar) ion milling was used to fabricate a cross section of each electrode of Examples 1 to 3 and Comparative Examples 1 and 2.

Energy dispersive spectroscopy (EDS) mapping of the constituent elements in the electrode layer of the electrode cross section was carried out using an EDS detector of a scanning electron microscopy (SEM) equipment. The measurement area includes the entire electrode coating layer and includes a portion of the current collector area, and the measurement was made in an image of size 1024 pixels and an aspect ratio of 4. The EDS mapping measurement was made on at least 10 frames in 5 kV acceleration voltage condition of SEM to measure data of the constituent elements of the active material except Li and H, the conductive material, the binder and the current collector.

A line profile created by EDS peak deconvolution in the thickness-wise direction of the electrode layer was extracted from the EDS mapping results through EDS analysis software (Oxford Aztec). Among the extracted line profile results, an average fluorine content Bs of the fluorine-containing binder of the electrode layer surface region and an average fluorine content Bf of the fluorine-containing binder of the electrode layer bottom region were extracted from the graph illustrating a change in normalized intensity of the binder of the electrode layer in a direction from the surface of the electrode layer to the current collector, and QBR was calculated using the following equation:

$$QBR = Bs/Bf$$

In this instance, the electrode layer surface region is a region within 15% of the total thickness d of the electrode layer from the outermost surface of the electrode layer in the thickness-wise direction of the electrode layer, and the electrode layer bottom region is a region within 15% of the total thickness of the electrode layer from the interface between the electrode layer and the current collector.

Figure 5:
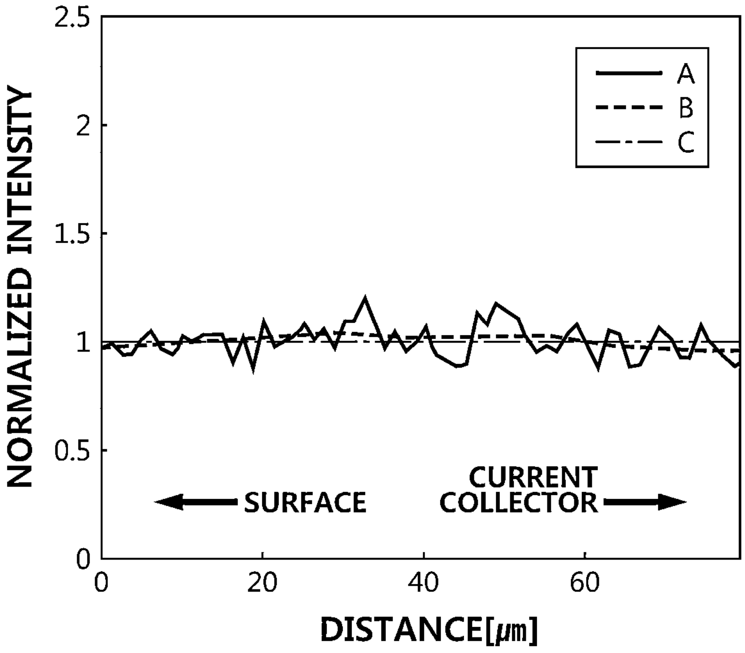
FIG. 5 is a graph illustrating a change in normalized fluorine intensity of a binder of an electrode layer of an electrode of Example 1 extracted and analyzed through energy dispersive spectroscopy (EDS) mapping at a distance from the surface of the electrode layer toward the current collector.

FIG. 5 is a graph illustrating a change in normalized fluorine intensity of the fluorine-containing binder of the electrode layer of the electrode of Example 1 extracted and analyzed from EDS mapping at a distance from the surface of the electrode layer toward the current collector. In the electrode of example 1, the average fluorine content (Bs) the fluorine-containing binder of the electrode layer surface region was 0.98, the average fluorine content (Bf) of the fluorine-containing binder of the electrode layer bottom region was 0.99, and the QBR value was 0.99.

In FIG. 5, line A indicates the intensity in each depth-wise direction when the total fluorine of the fluorine-containing binder actually measured is normalized to 1, line B is a trend line showing a trend of the line A by LOWESS, and line C is a line that always shows a value of 1.

Figure 6:
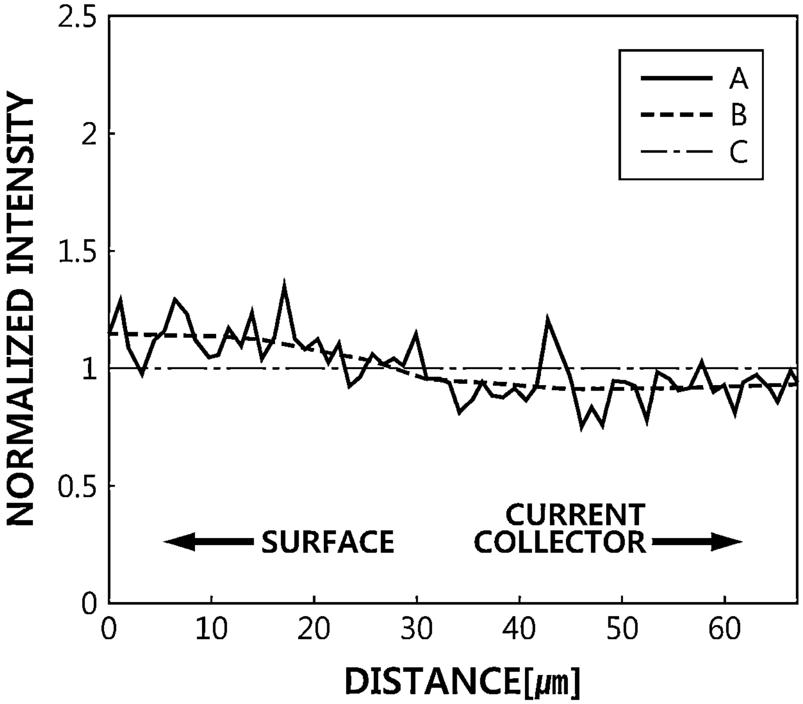
FIG. 6 is a graph illustrating a change in normalized fluorine intensity of a binder of an electrode layer of an electrode of Comparative Example 1 extracted and analyzed through EDS mapping at a distance from the surface of the electrode layer toward the current collector.

FIG. 6 is a graph illustrating a change in normalized fluorine intensity of the fluorine-containing binder of the electrode layer of the electrode of Comparative Example 1 extracted and analyzed from EDS mapping at a distance from the surface of the electrode layer toward the current collector. In the electrode of comparative Example 1, the average fluorine content (Bs) of the fluorine-containing binder of the electrode layer surface region was 1.13, the average fluorine content (Bf) of the fluorine-containing binder of the electrode layer bottom region was 0.91, and the QBR value was 1.24.

As defined in FIG. 5, also in FIG. 6, line B is a trend line showing a trend of line A by LOWESS, and line C is a line that always shows a value of 1.

(2) Adhesion Strength

Each electrode of Examples 1 to 3 and Comparative Examples 1 and 2 was tailored into a size of 20 mm (width)×100 mm (length) to prepare an electrode sample.

A 55 mm-long double-sided tape was attached to a slide glass, and each of the prepared electrode samples of Example 1 and Comparative Example 1 was laminated with the slide glass by using a laminator.

The adhesion strength between the electrode layer and the current collector of the electrode sample was measured using UTM equipment (90° peel test, load cell: 10N, speed: 100 mm/min.)

(3) Cell Resistance 1) 0.1 Sec

The charge/discharge characteristics of the batteries manufactured in Examples 1 to 3 and Comparative Examples 1 and 2 as described above were compared using a charge/discharge measurement device (available from PNE Solution Co.) Each battery was charged at 0.1 C constant current (CC), 25° C. for the first 1 cycle until 4.2 V, and then charged at a constant voltage (CV) until the charge current reaches the cut-off current of 0.05 C. Subsequently, the battery was allowed to rest for 30 minutes, discharged at 0.1 C constant current (CC) until 2.5 V, and then allowed to rest for 30 minutes again. Subsequently, charging at 0.33 C constant current, discharging at 0.33 C constant current and resting for 30 minutes was repeated for 3 cycles, and the last discharge was stopped when the discharge capacity reached half of the previous discharge capacity. Subsequently, the battery was discharged at 2.5 C constant current for 10 seconds, and a change in voltage was recorded at the time interval of 0.1 sec. When the open circuit voltage (OCV) at the end of the rest for 30 minutes is Vo, and the battery voltage recorded at the time of discharging the battery at 2.5 C constant current (I) for 0.1 sec is V, 0.1 sec resistance (R) is calculated as follows:

$$R = (V - V_0)/I$$

2) 10 Sec

As described above, using the same measurement condition and method as the method of calculating the 0.1 sec resistance, 10 sec resistance was calculated by substituting the battery voltage recorded at the time of discharging the battery at 2.5 C constant current for 10 sec to the above equation.

(4) Discharge Capacity

Figure 7:
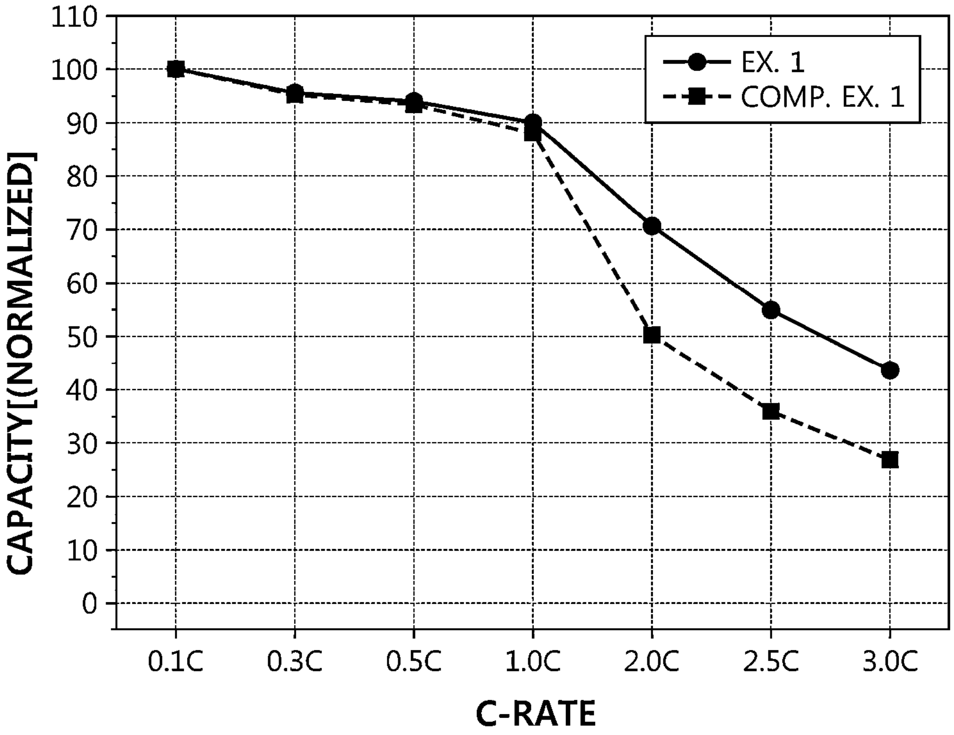
FIG. 7 is a graph illustrating a percentage of discharge capacity at 0.33 C, 0.5 C, 1 C, 2 C, 2.5 C and 3 C to discharge capacity at 0.1 C in secondary batteries comprising electrodes prepared in Example 1 and Comparative Example 1.

As described above, each of the secondary batteries comprising the electrodes prepared in Example 1 and Comparative Example 1 was charged at 0.33 C constant current (CC), 25° C. until 4.2 V, and charged at constant voltage (CV) until the charge current reaches the cut-off current of 0.05 C. Subsequently, the battery was allowed to rest for 30 minutes, and discharged at 0.1 C constant current until 2.5 V. Subsequently, the battery was allowed to rest for 30 minutes again, and then charged, allowed to rest and discharged under the same conditions except that the discharge C-rate was changed to 0.33 C, 0.5 C, 1 C, 2 C, 2.5 C and 3 C. In this instance, a percentage value (capacity (normalized)) of discharge capacity of 0.33 C, 0.5 C, 1 C, 2 C, 2.5 C and 3 C based on discharge capacity of 0.1 C is shown in FIG. 7 and Table 1.

(5) Bending Resistance

Bending resistance was evaluated in accordance with the measurement standard JIS K5600-5-1 method.

Specifically, each electrode manufactured in Examples 1 to 3 and Comparative Examples 1 and 2 was manufactured into a rectangular electrode sample of 100 mm×50 mm, each measurement rod having the diameter of 2,3,4,5,6,8,10,12, 16,20,25.32 mm was prepared, the electrode sample was brought into contact with the measurement rod using the measurement rod having the largest diameter, and determination was made as to whether cracking occurs in the mixture film of the electrode sample when pulling up two ends of the electrode sample.

When cracking did not occur in the previous step, the step of determining whether cracking occurred in the mixture film of the electrode sample was repeatedly performed in the same way as the previous step using the measurement rod having the next largest diameter, and the minimum diameter value of the measurement rod in which cracking did not occur in the mixture film of the electrode sample was determined as bending resistance.

(6) Degree of Crystallinity of Fluorine-Containing Binder in Electrode Layer

A sample for measuring the degree of crystallinity of the fluorine-containing binder in the electrode layer of each electrode manufactured in Examples 1 to 3 and Comparative Examples 1 and 2 was prepared. The degree of crystallinity (Xc) of each sample was measured by weighing about 5 mg to 12 mg of sample, feeding the sample into TA Instruments differential scanning calorimetry (DSC), heating up at 10° C./min in a temperature range between 25 and 360° C. under a nitrogen atmosphere, and measuring the melting enthalpy (A heat of fusion) as a function of temperature.

The melting point (Tm) and melting enthalpy (ΔHm) was analyzed using TA Instruments TROIS program on the basis of the temperature (peak temperature) at the time when the enthalpy is at the maximum during melting. The degree of crystallinity of each sample is a % ratio obtained by dividing the melting enthalpy ($\Delta H_m$) value actually measured by DSC DSC by the melting enthalpy ($\Delta H_m^0$) value of a theoretically perfect crystal (degree of crystallinity 100%), and was calculated by the following relationship equation 1.

$$Xc(\%) = (\Delta H_m \div \Delta H_m^0) \times 100 \quad \text{[Relationship equation 1]}$$

The melting enthalpy value ($\Delta H_m^0$) of a theoretically perfect crystal of polytetrafluoroethylene (PTFE) used as the fluorine-containing binder was 85.4 J/g, and reference was made to Polymer Journal vol. 46 (2005) pages 8872~8882.

TABLE 1

| | QBR | Adhesion strength (gf/2 cm) | Cell resistance (ohm @ 0.1 sec) | Cell resistance (ohm @ 10 sec) | Bending resistance (mm) | Discharge capacity (%, based on 0.1 C) @ 0.33 C | Discharge capacity (%, based on 0.1 C) @ 0.5 C | Discharge capacity (%, based on 0.1 C) @ 1 C | Discharge capacity (%, based on 0.1 C) @ 2 C | Discharge capacity (%, based on 0.1 C) @ 2.5 C | Discharge capacity (%, based on 0.1 C) @ 3 C |
|---|---|---|---|---|---|---|---|---|---|---|---|
| Ex. 1 | 0.99 | 41 | 0.50 | 0.77 | 4 | 95.9 | 94.1 | 90.4 | 70.9 | 55.1 | 43.6 |
| Comp. Ex. 1 | 1.24 | 35 | 0.56 | 0.88 | 6 | 95.3 | 93.3 | 88.2 | 50.0 | 36.1 | 27.0 |

TABLE 2

| | QBR | Adhesion strength (gf/2 cm) | Cell resistance (ohm @ 0.1 sec) | Cell resistance (ohm @ 10 sec) | Bending resistance (mm) | Degree of crystallinity (%) $\Delta Hm/\Delta Hm^0$ |
|---|---|---|---|---|---|---|
| Ex. 1 | 0.99 | 41 | 0.50 | 0.77 | 4 | 0 |
| Ex. 2 | 1.01 | 40 | 0.51 | 0.75 | 4 | 0.5 |
| Ex. 3 | 1.05 | 42 | 0.49 | 0.76 | 4 | 1.2 |
| Comp. Ex. 1 | 1.24 | 35 | 0.56 | 0.88 | 6 | 35.7 |
| Comp. Ex. 2 | 1.12 | 37 | 0.55 | 0.82 | 12 | 11.0 |

Referring to the above Tables 1 and 2, it was confirmed that the adhesion strength of the positive electrodes of Examples 1 to 3 having QBR of 1.1 or less was much higher than those of the positive electrode of Comparative Example 1 having QBR of 1.24 and the positive electrode of Comparative Example 2 having QBR of 1.12, the degree of crystallinity of the fluorine-containing binder included in the electrode layer of the positive electrodes of Examples 1 to 3 was controlled to 10% or less, and the secondary batteries using the positive electrodes of Examples 1 to 3 showed lower cell resistance than the secondary batteries using the positive electrodes of Comparative Examples 1 and 2, and the secondary battery using the positive electrode of Example 1 showed higher discharge capacity for each charge rate than the secondary battery using the positive electrode of Comparative Example 1.

What is claimed is:

1. An electrode, comprising:

an electrode current collector; and an electrode layer on the electrode current collector, the electrode layer comprising an active material, a conductive material and a fluorine-containing binder, wherein the fluorine-containing binder is fibrilized to bind the active material and the conductive material, wherein a degree of crystallinity of the fluorine-containing binder is 10% or less, wherein the fluorine-containing binder is polytetrafluoroethylene (PTFE), wherein the electrode layer has a quantified binder ratio (QBR) of 1.1 or less, and wherein the QBR is defined by the following equation:

$$QBR = Bs/Bf,$$

wherein Bs denotes an average fluorine content in an electrode layer surface region within 15% of a total thickness of the electrode layer from an outermost surface of the electrode layer, and Bf denotes an average fluorine content in an electrode layer bottom region within 15% of the total thickness of the electrode layer from an interface between the electrode layer and the current collector.

2. The electrode according to claim 1, wherein the conductive material comprises at least one of a carbon-based material, a metal material, a conductive whisker, a conductive metal oxide or a conductive polymer.

3. The electrode according to claim 1, wherein the active material is a positive electrode active material or a negative electrode active material.

4. The electrode according to claim 1, wherein the active material is present in an amount of 85 to 98 parts by weight, the conductive material is present in an amount of 0.5 to 5 parts by weight, and the fluorine-containing binder is present in an amount of 0.5 to 10 parts by weight.

5. The electrode according to claim 1, wherein the electrode current collector further comprises a conductive primer layer on at least one surface thereof.

6. The electrode according to claim 1, wherein the electrode layer has the QBR of 0.95 to 1.05.

7. The electrode according to claim 1, wherein the electrode has a bending resistance of 10 mm Φ or less.

8. The electrode according to claim 7, wherein the bending resistance of the electrode is defined in accordance with a measurement standard JIS K5600-5-1 method.

9. The electrode according to claim 7, wherein the bending resistance of the electrode is defined by:

preparing a rectangular electrode sample of 100 mm×50 mm;

preparing measurement rods of 2, 3, 4, 5, 6, 8, 10, 12, 16, 20, 25 and 32 mm in diameter, bringing the electrode sample into contact with the measurement rod having the largest diameter and determining whether cracking occurs in a mixture film of the electrode sample when pulling up two ends of the electrode sample; and when cracking does not occur in the previous step, determining whether cracking occurs in the mixture film of the electrode sample in a same way as the previous step using the measurement rod having the next largest diameter, and repeatedly performing this process to determine, as the bending resistance, a minimum diameter value of the measurement rod at which cracking does not occur in the mixture film of the electrode sample.

10. The electrode according to claim 1, wherein the electrode layer is formed by a dry process.

11. A method for manufacturing the electrode according to claim 1, the method comprising:

preparing a mixture comprising the active material, the conductive material and the fluorine-containing binder;

kneading the mixture in a temperature range between 70° C. and 200° C. under a pressure that is equal to or higher than an atmospheric pressure to prepare a mixture agglomerate;

pulverizing the mixture agglomerate to obtain a mixed powder for electrodes;

feeding the mixed powder for electrodes in between a plurality of rolls, followed by calendering to form a film for electrodes; and laminating the film for electrodes onto a metal current collector.

12. The method for manufacturing the electrode according to claim 11, wherein the kneading to prepare the mixture agglomerate is performed in a kneader under the pressure that is equal to or higher than the atmospheric pressure.

13. The method for manufacturing the electrode according to claim 11, wherein a compression ratio of the film for electrodes is 30 to 50% in the lamination.

14. The method for manufacturing the electrode according to claim 11, wherein a roll pressing ratio of the film for electrodes is 20% or less.

15. The method for manufacturing the electrode according to claim 11, wherein an increase in apparent density of the film for electrodes from before to after the lamination with the current collector is 5 to 30%.

16. The method for manufacturing the electrode according to claim 11, wherein the lamination is performed by lamination rolls at 25° C. to 250° C.

17. An electrode manufactured by the method of claim 11.

18. A secondary battery comprising a positive electrode, a negative electrode and a separator interposed between the positive electrode and the negative electrode, wherein at least one of the positive electrode or the negative electrode is defined in claim 1.

19. An energy storage system comprising the secondary battery according to claim 18 as a unit cell.

* * * * *